United States Patent [19]

Toshiro et al.

[11] Patent Number: 5,720,166
[45] Date of Patent: Feb. 24, 1998

[54] FUEL SUPPLY CONTROL DEVICE FOR AN ENGINE

[75] Inventors: Takayuki Toshiro, Fujisawa; Koichi Mori, Sagamihara; Kimiyoshi Nishizawa, Yokohama, all of Japan

[73] Assignee: Nissan Motor Co., Ltd., Yokohama, Japan

[21] Appl. No.: 622,395

[22] Filed: Mar. 27, 1996

[30] Foreign Application Priority Data

Mar. 29, 1995 [JP] Japan .................... 7-071888

[51] Int. Cl.$^6$ ................ F02D 41/08; F01N 3/20
[52] U.S. Cl. ........................ 60/284; 60/285
[58] Field of Search .................. 60/284, 285

[56] References Cited

U.S. PATENT DOCUMENTS

| | | | |
|---|---|---|---|
| 3,949,551 | 4/1976 | Eichler et al. | 60/284 X |
| 5,483,946 | 1/1996 | Hamburg et al. | 60/284 X |
| 5,584,176 | 12/1996 | Meyer et al. | 60/284 X |

FOREIGN PATENT DOCUMENTS 6-81696  3/1994  Japan .

*Primary Examiner*—Tony M. Argenbright
*Attorney, Agent, or Firm*—Foley & Lardner

[57] ABSTRACT

An engine is equipped with a mechanism for supplying supplementary air into an exhaust conduit upstream of a catalytic converter in order to increase catalytic activity thereof. An incremental proportion for fuel supply during this supply of supplementary air is determined so as to keep the concentration of oxygen upstream of the catalytic converter substantially at a predetermined value which corresponds to an air/fuel ratio on the lean side of stoichiometric. Further, the amount of fuel supplied is corrected according to the greater of this incremental proportion and an incremental proportion which is determined according to the temperature of the engine. By doing this, the oxygen concentration in the vicinity of the intake of the catalytic converter is maintained at the predetermined value which is lean, and the catalyst is activated at an early stage.

5 Claims, 5 Drawing Sheets

FUEL SUPPLY CONTROL DEVICE FOR AN ENGINE

FIELD OF THE INVENTION

This invention relates to fuel supply control when supplementary air is fed into an exhaust passage of an engine upstream of a catalytic converter.

BACKGROUND OF THE INVENTION

When an engine is running in the idling state and its temperature is low, the air-fuel ratio of the fuel mixture supplied to the engine is enriched and supplementary air is fed into the exhaust passage upstream of a catalytic converter thereof, CO and HC in the exhaust gas combine with the oxygen contained in this supplementary air, and it is per se known that the activity of the catalyst is increased by the heat of oxidation. However, if the air/fuel ratio is enriched too much, irregularity in the rotation of the engine and misfiring may occur.

In this connection the concept was disclosed in Tokkai Hei 6-81696 published by the Japanese Patent Office in 1994, of detecting the level of stability of the engine during the supply of supplemental air from irregularity in the rotation of the engine, and of increasing the supply of fuel so as to enrich the air/fuel ratio, only when this stability so permits.

However, if increase of the amount of fuel is only dependent upon the stability in operation of the engine, it can happen that the balance between the amount of fuel increase and the amount of supplementary air becomes confused and the amount of supplementary air becomes insufficient, so that the oxidation reaction is not performed adequately.

Further, generally the amount of fuel supplied to an engine should be increased when the temperature of its coolant is low, i.e. so called coolant temperature compensation should be performed. When this coolant temperature compensation and the compensation quantity for catalyst activity increase are combined, the air/fuel ratio is enriched further.

When this is done, if the oxidizing reaction does not occur adequately, to that extent the increase in activity of the catalyst undesirably lags.

SUMMARY OF THE INVENTION

It is therefore an object of this invention to prevent excessive enrichment of the air/fuel ratio when supplementary air is fed into the exhaust passage.

It is a further object of this invention to prevent delay in increase of the activity of the catalyst due to an excessive degree of enrichment of the air/fuel ratio when supplementary air is fed into the exhaust passage.

In order to achieve the above objects, this invention provides a fuel supply control device fitted to such an engine that comprises an exhaust conduit, a catalytic converter provided in said exhaust conduit, and a mechanism for selectively feeding supplementary air into the exhaust conduit on the upstream side of the catalytic converter. The control device comprises a mechanism for detecting a warming-up state of the engine, a mechanism for determining a first incremental proportion for fuel supply amount for the engine according to the warming-up state of the engine, a mechanism for detecting the feeding in of supplementary air, a mechanism for detecting the idling operational state of the engine, a mechanism for, when both the feeding in of supplementary air and the engine idling operational state are detected, determining a second incremental proportion for fuel supply amount for the engine in correspondence to the feeding in of supplementary air, so as to keep the concentration of oxygen at the upstream side of the catalytic converter substantially at a predetermined value which corresponds to an air/fuel ratio on the lean side of stoichiometric, a mechanism for determining a final incremental proportion by selecting the larger one of the first and the second incremental proportion, and a mechanism for correcting a fuel supply amount for the engine according to the final incremental proportion.

It is preferable that the control device further comprises a mechanism for detecting the amount of air inhaled by the engine, and the second incremental proportion determination mechanism comprises a mechanism for calculating the second incremental proportion based upon the amount of air inhaled by the engine, a feed in amount of the supplementary air, and the predetermined value.

It is further preferable that the second incremental proportion determination mechanism further comprises a mechanism for limiting the calculated second incremental proportion to a previously determined upper limit.

It is also preferable that the second incremental proportion determination mechanism determines the second incremental proportion according to the warming-up state of the engine.

According to another aspect of this invention, the control device comprises a mechanism for detecting a warming-up state of the engine, a mechanism for determining a first incremental proportion for fuel supply amount for the engine according to the warming-up state of the engine, a mechanism for detecting the feeding in of supplementary air, a mechanism for detecting in idling operational state of the engine, a mechanism for, when both the feeding in of supplementary air and the engine idling operational state are detected, determining a target value for a second incremental proportion for fuel supply amount for the engine in correspondence to the feeding in of supplementary air, so as to keep the concentration of oxygen at the upstream side of the catalytic converter substantially at a predetermined value which corresponds to an air/fuel ratio on the lean side of stoichiometric, a mechanism for gradually changing the second incremental proportion in the direction of the target value along with the passage of time from the determination of the target value, a mechanism for determining a final incremental proportion by selecting the larger one of the first and said second incremental proportion, and a mechanism for correcting a fuel supply amount for the engine according to the final incremental proportion.

The details as well as other features and advantages of this invention are set forth in the remainder of the specification and are shown in the accompanying drawings.

DESCRIPTION OF THE PREFERRED EMBODIMENTS

Figure 1:
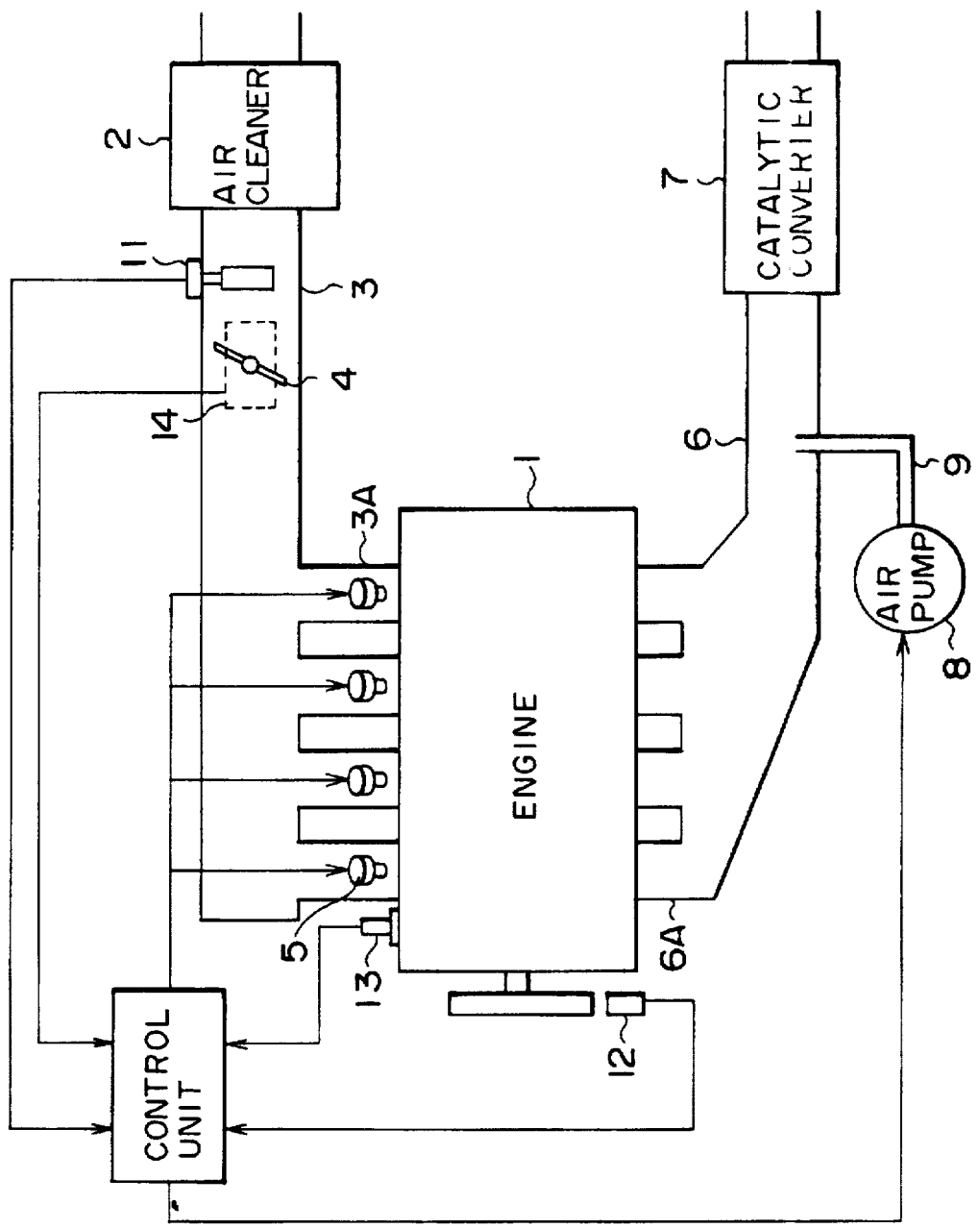
FIG. 1 is a schematic diagram of an engine to which a fuel supply control device according to a first embodiment of this invention is fitted.

Referring to FIG. 1 of the drawings, a multi cylinder liquid cooled engine 1 inhales air from an air cleaner 2 via an intake passage 3. The amount of inhaled air is controlled by a throttle valve 4. The intake passage 3 is connected to each cylinder of the engine 1 via an intake manifold 3A. For each cylinder, a fuel injection valve 5 is provided within the intake manifold 3A, and each of these fuel injection valves 5 injects fuel into the air which is being inhaled into its corresponding cylinder.

The fuel injection valves 5 are electromagnetic type fuel injection valves which inject fuel under the control of drive signals which are supplied to them from a control unit 10, and the amount of fuel which they inject corresponds to the pulse width of these drive signals. Accordingly, the air/fuel ratio of the mixture gas which is supplied to the engine 1 can be varied by this pulse width.

The mixture gas in each of the cylinders of the engine 1 is ignited by a spark plug not shown in the figure and undergoes combustion, and the resulting exhaust gas is discharged via an exhaust manifold 6A which is connected to the cylinders into an exhaust conduit 6.

Part way along the exhaust conduit 6 there is interposed a catalytic converter 7 which uses a three way catalyst and which purifies the exhaust gas of harmful components such as HC, CO, and NOx contained therein by oxidation and reduction thereof.

A supplementary air feed conduit 9 is connected to the exhaust conduit 6 upstream of the catalytic converter 7, and feeds supplementary air thereinto. Air is supplied into this supplementary air feed conduit 9 by an electrically driven air pump 8. The operation of this air pump 8 is controlled in an on and off manner by a signal which is output from the control unit 10, and when the air pump 8 is operating it supplies a constant flow Qap of supplementary air into the supplementary air feed conduit 9.

In order for the control unit 10 to control the amount of fuel injection performed by the fuel injection valves 5, signals are supplied to it from an air flow meter 11, a crank angle sensor 12, a coolant temperature sensor 13, and an idle switch 14.

The air flow meter 11 is provided upstream of the throttle valve 4 in the intake passage 3, and measures the inhaled air flow Q.

The crank angle sensor 12 outputs a standard position signal when the crankshaft (not shown) of the engine 1 is in a predetermined standard rotational positions corresponding to a specific piston position of respective cylinder, and also outputs a much finer unit crank angle signal every time the crankshaft moves through a predetermined rotational angle, e.g., one degree.

The coolant temperature sensor 13 is fitted into the coolant jacket which contains the coolant for the engine 1, and outputs a coolant temperature signal Tw.

The idle switch 14 outputs an on signal when the throttle valve 4 is fully closed, in order to indicate that the engine 1 is in the idling state.

Figure 2:
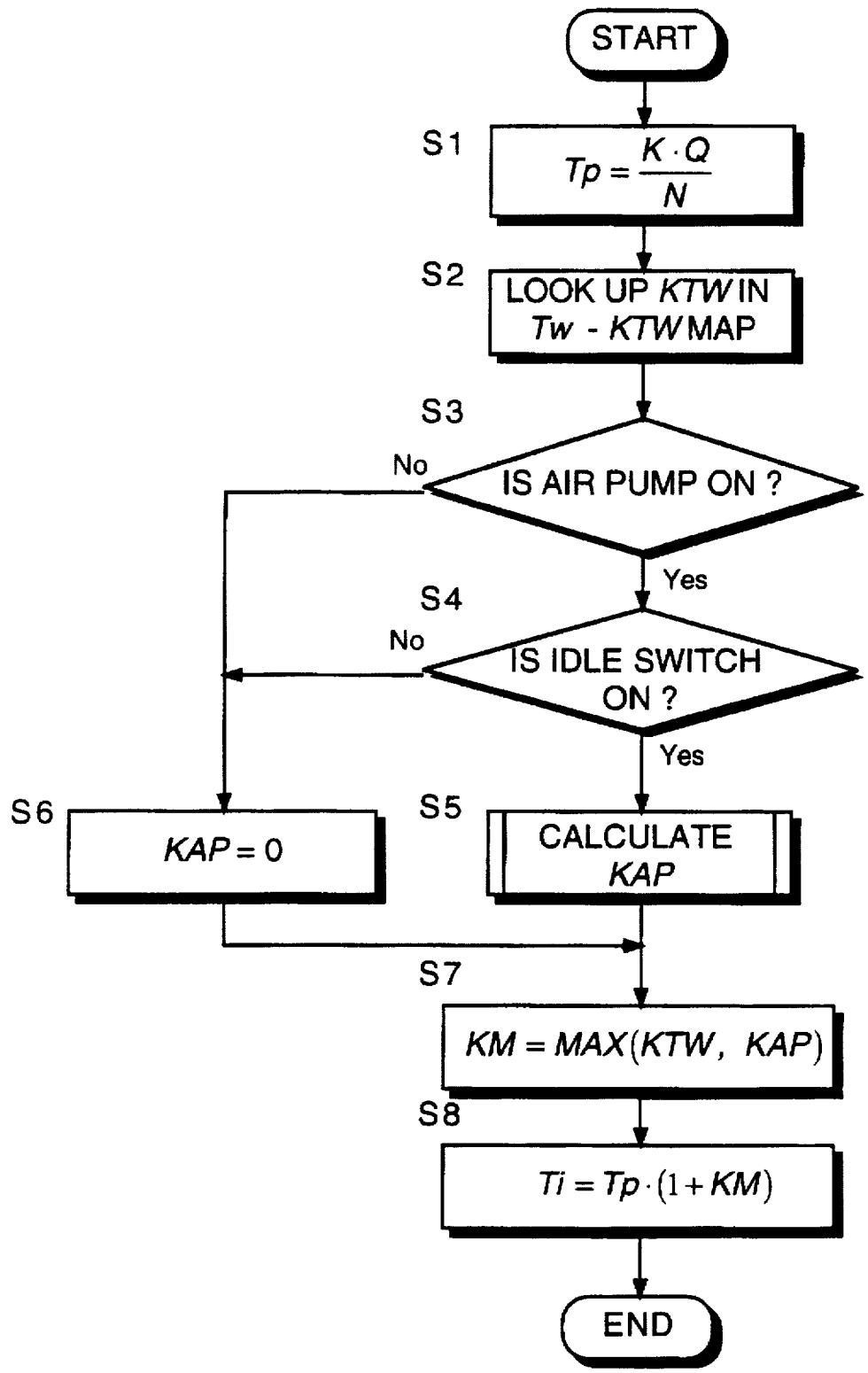
FIG. 2 is a flow chart showing a process for calculating fuel injection amount, according to the first embodiment of this invention.

The control unit 10 comprises a microcomputer, which calculates a fuel injection amount Ti according to the process shown in FIG. 2 based upon the output signals from the various sensors described above, and outputs drive signals having pulse widths corresponding to this value Ti to the fuel injection valves 5 at timings synchronized with the rotation of the crankshaft of the engine 1.

To explain this process, first in the step S1 of FIG. 2 a basic fuel injection amount Tp for the current inhaled air flow Q corresponding to the stoichiometric air/fuel ratio is calculated according to the following equation from the inhaled air amount Q obtained from the air flow meter 11 and the engine revolution speed N obtained from the output signal of the crank angle sensor 12:

$$Tp = \frac{K \cdot Q}{N}$$

where K is a constant.

In the step S2, a coolant temperature incremental proportion KTW, which is a first incremental proportion based upon the coolant temperature Tw, is determined by looking up an internally stored map. This coolant temperature incremental proportion KTW is a value which is determined by this map as being the greater, the lower is the coolant temperature Tw.

In the step S3, a decision is made as to whether or not the air pump 8 is on, i.e. as to whether or not supplementary air is currently being fed into the exhaust conduit 6, and if the air pump 8 is on then the flow of control continues to the step S4.

In the step S4, a decision is made as to whether or not the idle switch 14 is on, and if it is on then the flow of control continues to the step S5. Accordingly, the flow of control only reaches the step S5 if supplementary air is being provided and also the engine is idling.

In the step S5, a supplementary air incremental proportion KAP, which is a second incremental proportion, is calculated so as to make the oxygen concentration in the exhaust conduit 6 at the intake of the catalytic converter 7 leaner than the value which corresponds to the stoichiometric air/fuel ratio, i.e. so as to make the excess air ratio λ greater than 1.

Figure 3:
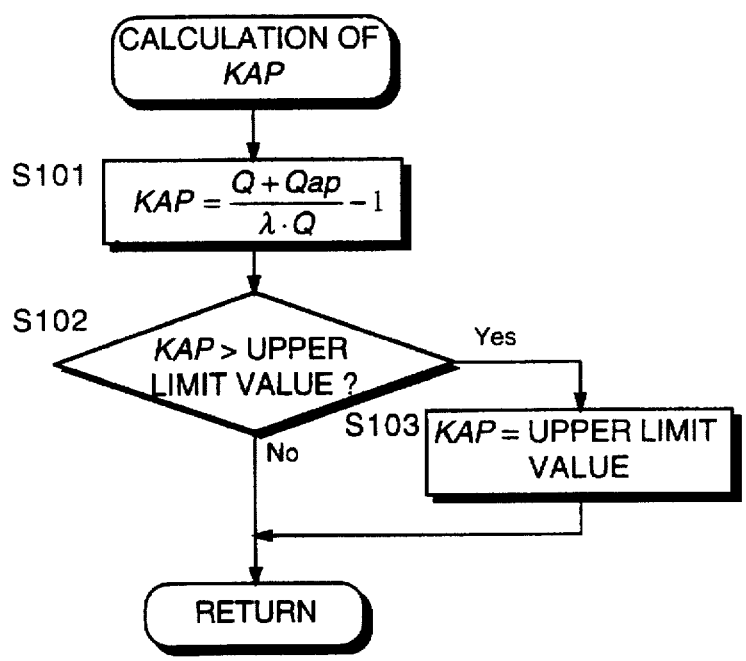
FIG. 3 is a flow chart showing a process for calculating a supplementary air incremental proportion KAP, according to the first embodLment of this invention.

This calculation process is shown in FIG. 3.

In the step S101, the supplementary air incremental proportion KAP is calculated from the inhaled air flow Q, the constant supplementary air flow Qa, and the target excess air ratio λ at the intake of the catalytic converter 7, according to the following equation:

$$KAP = \frac{Q + Qap}{\lambda \cdot Q} - 1$$

In the next step S102, the calculated value for the supplementary air incremental proportion KAP and an upper limit value therefor which is determined in advance are compared, and if the calculated value for KAP is greater than this upper limit value then KAP is set to the upper limit value. This is done in order not to provoke misfiring, which might be caused by too much enrichment of the air/fuel ratio. If the calculated value for KAP is not greater than the upper limit value then it is used without any alteration. Finally the flow of control returns from this subroutine.

If on the other hand the result of the decision in the step S3 is that the air pump 8 is off, or if the result of the decision in the step S4 is that the idle switch 14 is off, then the flow of control is transferred to the step S6, in which the supplementary air incremental proportion KAP is set to zero.

In the step S7, the final incremental proportion KM is calculated as being the greater of the coolant temperature incremental proportion KTW and the supplementary air incremental proportion KAP, i.e. according to the following equation:

$$KM=MAX(KTW, KAP)$$

In the step S8, the final fuel injection amount Ti is calculated by correcting the basic fuel injection amount Tp according to the following equation:

$$Ti=Tp\cdot(1+KM)$$

Various other corrections may be applied during the calculation of the final fuel injection amount Ti, such as an acceleration correction, an air/fuel ratio feedback correction, a battery voltage correction, etc., but no explanation will be provided regarding such additional corrections because they are not relevant to this invention.

The calculated final fuel injection amount Ti is written into a predetermined register in the control unit 10, and drive signals having pulse widths corresponding to this value Ti are output at predetermined fuel injection timing points to the fuel injection valves 5, so as to perform fuel injection.

Since, in this manner, during engine idling when supplementary air is being supplied, the supplementary air incremental proportion KAP is set so as to make the oxygen concentration at the intake of the catalytic converter 7 leaner than the value which corresponds to the stoichiometric air/fuel ratio, and the greater one of this value KAP and the coolant temperature incremental proportion KTW is utilized for correction of the amount of fuel to be injected, thereby, although the oxygen concentration at the intake of the catalytic converter 7 is lean, it is maintained in a range which has no tendency to become very lean. Accordingly, on the one hand a sufficient quantity of air is supplied for the oxidation reaction, while on the other hand it is ensured that the quantity of air supplied does not become too great (which would cool down the catalyst), so that it is possible efficiently to increase the activity of the catalyst by elevating its temperature.

Figure 4:
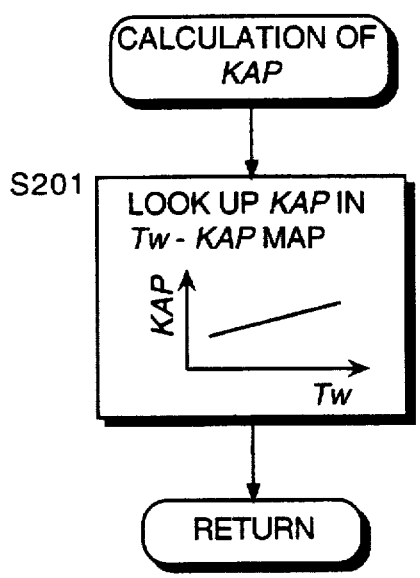
FIG. 4 is a flow chart showing a process of calculating the supplementary air incremental proportion KAP, according to a second embodiment of this invention.

FIG. 4 shows a second embodiment of this invention. In this second embodiment, a map is constructed which determines the supplementary air incremental proportion KAP according to the coolant temperature Tw, in order to keep the oxygen concentration at the intake of the catalytic converter 7 leaner than the value which corresponds to the stoichiometric air/fuel ratio. When deriving the supplementary air incremental proportion KAP, rather than calculating it by executing the process shown in FIG. 3, instead the value of the supplementary air incremental proportion KAP is looked up from this map. Moreover, KAP is set to be the greater, the higher is the coolant temperature Tw.

It would also be possible to determine the supplementary air incremental proportion KAP according to the coolant temperature when stating the engine Tws, instead of according to the coolant temperature Tw.

Figure 5:
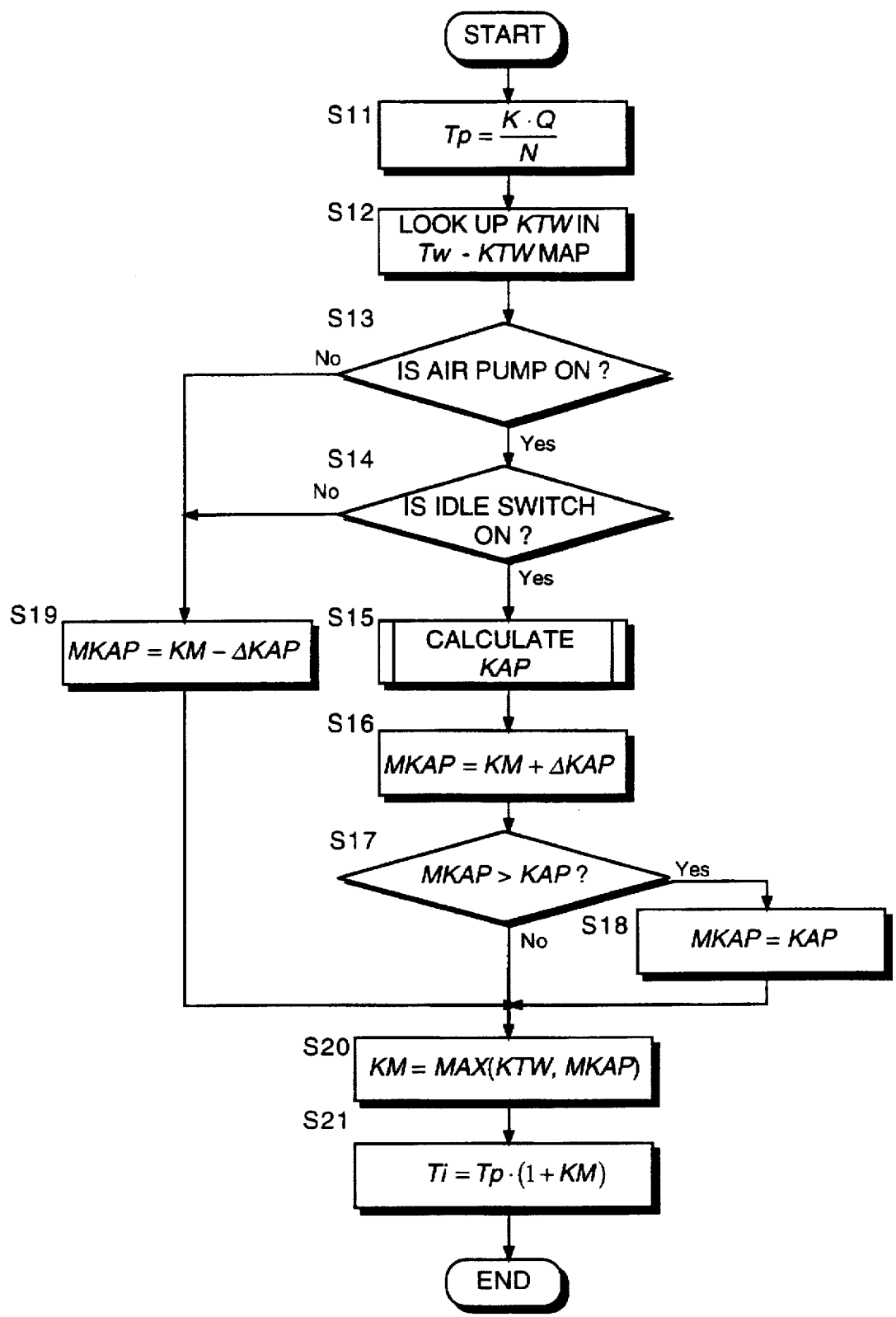
FIG. 5 is similar to FIG. 2, but showing a third embodiment of this invention.

FIG. 5 shows a third embodiment of this invention. In this third embodiment, the process shown in FIG. 5 is executed for calculating the fuel injection amount, instead of the process shown in FIG. 2.

The steps S11 through S15 are the same as the steps S1 through S5 of FIG. 2.

However, in this embodiment, the value of the supplementary air incremental proportion KAP calculated in the step S15 is considered as a target supplementary air incremental proportion. In this third embodiment, the calculated air incremental proportion KAP in the step S15 is not utilized directly for the determination of the final incremental proportion KM; instead, the final incremental proportion KM is increased each time by a predetermined value ΔKAP, and this is in order to attain the target supplementary air incremental proportion KAP.

In order to do this, in the step S16 a supplementary air incremental proportion MKAP is determined according to the following equation:

$$MKAP=KM+\Delta KAP$$

In the step S17, the supplementary air incremental proportion MKAP and the target supplementary air incremental proportion KAP are compared.

If MKAP>KAP, then in the step 818 the supplementary air incremental proportion MKAP is set equal to KAP.

If the result of the decision in the step S13 is that the air pump 8 is off, or if the result of the decision in the step S14 is that the idle switch 14 is off, then the flow of control is transferred to the step S19.

Here, instead of immediately setting the incremental proportion to zero as was done in the step S6, it is reduced each time by the predetermined value ΔKAP as shown by the following equation:

$$MKAP=KM-\Delta KAP$$

The steps S20 and S21 are the same as the steps S7 and S8 of FIG. 2.

Figure 6:
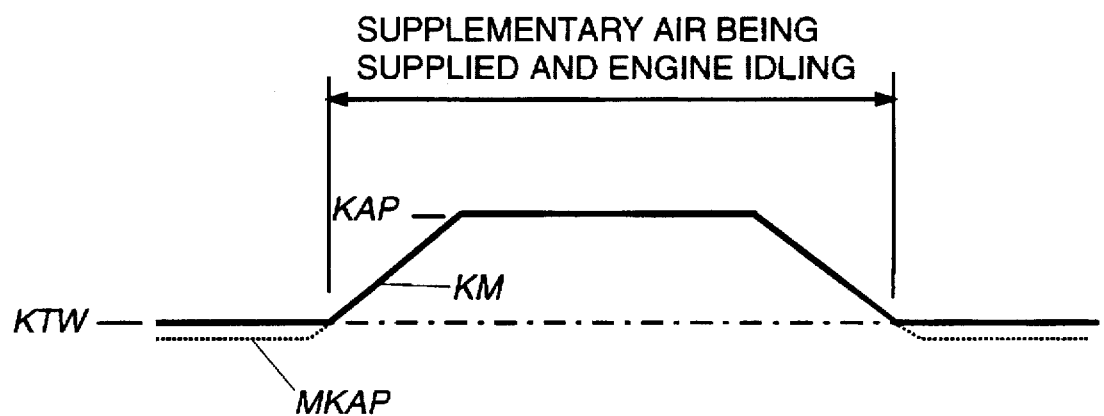
FIG. 6 is a diagram showing variation of a fuel increase amount ratio, for the third embodiment of this invention.

In this third embodiment, as shown in FIG. 6, when the condition holds that supplementary air is being supplied and also the engine is idling, the final incremental proportion KM is gradually increased until it reaches the supplementary air incremental proportion KAP which makes the oxygen concentration at the intake of the catalytic converter 7 to be a predetermined value somewhat upon the lean slde. On the other hand, if this condition stops holding, then the final incremental proportion KM is gradually decreased until it reaches the coolant temperature incremental proportion KTW.

For this reason, changeover of the incremental proportion between KTW and KAP is performed smoothly without any sudden change, and no bad influence is exerted upon the stability of the engine or upon the composition of the exhaust gas.

Moreover, it would also be acceptable to utilize either the calculation process shown in FIG. 3 for the first embodiment or the calculation process shown in FIG. 4 for the second embodiment in the calculation in the step S15 of the target supplementary air incremental proportion KAP.

Accordingly, although this invention has been shown and described in terms of the preferred embodiment thereof, it is not to be considered as limited by any of the perhaps quite fortuitous details of said embodiment, or of the drawings, but only by the terms of the appended claims, which follow.

We claim:

1. A fuel supply control device, fitted to an engine which comprises an exhaust conduit, a catalytic converter provlded in said exhaust conduit, and means for selectively feeding supplementary air into said exhaust conduit on the upstream side of said catalytic converter, comprising:

means for detecting a warming-up state of said engine;

means for determining a first incremental proportion for fuel supply amount for said engine according to said warming-up state of said engine;

means for detecting said feeding in of supplementary air;

means for detecting the idling operational state of said engine;

means for, when both said feeding in of supplementary air and said engine idling operational state are detected, determining a second incremental proportion for fuel supply amount for said engine in correspondence to said feeding in of supplementary air, so as to keep the concentration of oxygen at the upstream side of said catalytic converter substantially at a predetermined value which corresponds to an air/fuel ratio on the lean side of stoichiometric;

means for determining a final incremental proportion by selecting the larger one of said first and said second incremental proportion; and means for correcting a fuel supply amount for said engine according to said final incremental proportion.

2. A fuel supply control device according to claim 1, further comprising means for detecting the amount of air inhaled by said engine, and wherein said second incremental proportion determination means comprises means for calculating said second incremental proportion based upon said amount of air inhaled by said engine, a feeding in amount of supplementary air, and said predetermined value.

3. A fuel supply control device according to claim 2, wherein said second incremental proportion determination means further comprises means for limiting said calculated second incremental proportion to a previously determined upper limit.

4. A fuel supply control device according to claim 1, wherein said second incremental proportion determination means determines said second incremental proportion according to the warming-up state of said engine.

5. A fuel supply control device, fitted to an engine which comprises an exhaust conduit, a catalytic converter provided in said exhaust conduit, and means for selectively feeding supplementary air into said exhaust conduit on the upstream side of said catalytic converter, comprising:

means for detecting a warming-up state of said engine;

means for determining a first incremental proportion for fuel supply amount for said engine according to said warming-up state of said engine;

means for detecting said feeding in of supplementary air;

means for detecting in idling operational state of said engine;

means for, when both said feeding in of supplementary air and said engine idling operational state are detected, determining a target value for a second incremental proportion for fuel supply amount for said engine in correspondence to said feeding in of supplementary air, so as to keep the concentration of oxygen at the upstream side of said catalytic converter substantially at a predetermined value which corresponds to an air/fuel ratio on the lean side of stoichiometric;

means for gradually changing said second incremental proportion in the direction of said target value along with the passage of time from the determination of said target value;

means for determining a final incremental proportion by selecting the larger one of said first and said second incremental proportion; and means for correcting a fuel supply amount for said engine according to said final incremental proportion.

* * * * *